United States Patent [19]
Truebenbach

[11] Patent Number: 5,611,978
[45] Date of Patent: Mar. 18, 1997

[54] PRODUCTION OF SINTERED MOLDINGS

[75] Inventor: Peter Truebenbach, Ludwigshafen, Germany

[73] Assignee: BASF Aktiengesellschaft, Ludwigshafen, Germany

[21] Appl. No.: 492,117

[22] PCT Filed: Jan. 12, 1994

[86] PCT No.: PCT/EP94/00072

§ 371 Date: Aug. 10, 1995

§ 102(e) Date: Aug. 10, 1995

[87] PCT Pub. No.: WO94/25205

PCT Pub. Date: Nov. 10, 1994

[51] Int. Cl.⁶ .................... C04B 40/00; C04B 35/64
[52] U.S. Cl. .................... 264/63; 264/82; 419/44
[58] Field of Search ................ 264/63, 82; 419/44

[56] References Cited

U.S. PATENT DOCUMENTS

| | | | |
|---|---|---|---|
| 5,043,121 | 8/1991 | Wingefeld et al. | 264/82 |
| 5,188,782 | 2/1993 | Bittler et al. | 264/82 |

*Primary Examiner*—Christopher A. Fiorilla
*Attorney, Agent, or Firm*—Keil & Weinkauf

[57] ABSTRACT

Sintered moldings are produced by molding a mixture of a sinterable ceramic or metallic powder and polyoxymethylene or a copolymer containing a majority of oxymethylene units as binder to give a compact, removing the binder by treatment with a gaseous acid, and sintering the product, which comprises removing the binder using an acid which is solid at room temperature and sublimes or melts and evaporates at elevated temperatures.

7 Claims, No Drawings

PRODUCTION OF SINTERED MOLDINGS

The present invention relates to an improved process for the production of sintered moldings by molding a mixture of a sinterable ceramic or metallic powder and polyoxymethylene or a copolymer containing a majority of oxymethylene units as binder to give a compact, removing the binder by treatment with a gaseous acid, and sintering the product.

EP-A-413 231 describes a process for the production of inorganic sintered moldings in which compacts of sinterable powders and polyoxymethylene as binder are injection molded or extruded. The binder is removed from these compacts by treatment with a gaseous acid or gaseous boron trifluoride, preferably in a stream of inert carrier gas, and the resultant parts are sintered.

The earlier application P 42354293 discloses a further-developed process for the production of sintered moldings in which the binder polyoxymethylene is removed under reduced pressure and thus without using a carrier gas.

A common feature of both processes is the type of acids to be used for removing the binder, namely acids which are gaseous at room temperature, for example hydrogen halides and hydrogen sulfide, or liquid at room temperature, such as nitric acid, sulfuric acid, formic acid and acetic acid. However, these acids remain in the gas phase and corrode all apparatus parts which come into contact with the gas phase, or form liquid films which are likewise corrosive. In addition, disposal of these gases is not straightforward.

It is an object of the present invention to overcome these problems.

We have found that this object is achieved by a process for the production of sintered moldings by molding a mixture of a sinterable ceramic or metallic powder and polyoxymethylene or a copolymer containing a majority of oxymethylene units as binder to give a compact, removing the binder by treatment with a gaseous acid, and sintering the product, which comprises removing the binder using an acid which is solid at room temperature and sublimes or melts and evaporates at elevated temperatures.

Suitable sinterable powders for the novel process are oxidic, ceramic powders, such as $Al_2O_3Y_2O_3$, $SiO_2$, $ZrO_2$, $TiO_2$, $Al_2TiO_5$ or $YBa_2Cu_3O_{7-x}$ as ceramic superconductor. Also suitable are oxide-free ceramic powders, such as $Si_3N_4$, SiC, BN, $B_4C$, AlN, TiC, TiN, TaC and WC.

Examples of suitable metal powders are Fe, Al, Cu, Nb, Ti, Mn, V, Ni, Cr, Co, Mo, W and Si powders. The metal powders can also be employed in the form of alloys, for example as intermetallic phases such as TiAl, $Ti_3Al$ and $Ni_3Al$. Graphite and carbon black are also suitable. It is of course also possible to use mixtures of said materials.

The particle size of the powders is generally from 0.005 to 100 μm, preferably from 0.1 to 30 μm, particularly preferably from 0.2 to 10 μm.

The binders to be employed according to the invention comprise polyoxymethylene, advantageously having a molecular weight of from 10,000 to 500,000. In addition to homopolymers of formaldehyde or trioxane, copolymers of trioxane with, for example, cyclic ethers, such as ethylene oxide and 1,3-dioxolane, or formals, such as butanediol formal, are also suitable, the amounts of the comonomers generally being from 1 to 4% by weight of the polymers.

The materials to be molded usually contain from 40 to 70% by volume of the sinterable powder in addition to the binder. Furthermore, inorganic fibers or whiskers of, for example, $Al_2O_3$, SiC, $Si_3N_4$ or C can be added to the materials, which may also contain auxiliaries, such as dispersants, lubricants, such as polyethylene glycol or stearic acid, or further thermoplastic binders, such polyethylene, polymethyl methacrylate or polyethylene oxide.

The amount of auxiliaries is Generally from 0.1 to 12% by weight of the total material.

After all the components have been mixed, for example in a compounder or extruder, the materials are molded, for example by injection molding in conventional screw or plunger injection-molding machines, at from 160° to 200° C. and at from 500 to 2000 bar.

The resultant compacts are treated with acids, which degrade the binder polyoxymethylene to give gaseous products, predominantly formaldehyde. The gaseous degradation products are usually removed from the reaction zone.

Suitable acids are those which are solid at room temperature and sublime or melt and evaporate at elevated temperature, preferably those having a sublimation or melting point of between 25° and 200° C.

Particular preference is given to anhydrous oxalic acid or oxalic acid dihydrate. Glyoxalic acid is also suitable, as are benzenesulfonic acid, naphthalene-sulfonic acids and maleic acid, and mixtures thereof. During binder removal, these can be employed either alone or together with a carrier gas, such as air, nitrogen or a noble gas.

At the binder-removal temperature, the acids to be used according to the invention are first converted into the gas phase, where they act on the binder and sublime or solidify after cooling on the walls of the binder-removal apparatus. In a subsequent binder-removal step, they are again converted into the gas phase, ie. virtually no acid escapes from the apparatus. This is a particularly preferred embodiment of the novel process.

In order to simplify metering, it may be expedient to employ the abovementioned acids as solutions in polar solvents, preferably having boiling points of below 200° C. Suitable solvents are, in particular, acetone, dioxane, ethanol and acetonitrile.

The temperature during binder removal is generally from 100° to 160° C., preferably below the softening point of the binder.

The binder removal can be carried out under reduced pressure or preferably at atmospheric pressure, in which case a carrier gas, in particular nitrogen, is also used. There is no need for the carrier gas when binder removal is carried out under reduced pressure.

The novel process has the advantage that, due to their solid form at room temperature, the acids to be used are easy to transport and meter and require no special safety precautions.

A further advantage is that the binder can easily be removed from compacts made from oxidation-sensitive sinter materials such as WC/Co and Cu.

EXAMPLES

Example 1

Powders 1 to 8 shown in the table, with mean particle sizes PS, were compounded in the stated amounts with a polyoxymethylene copolymer made from trioxane and 2% by weight of butanediol formal having a mean molecular weight of 150,000 and with 2% by weight of polyethylene (Nos. 1 to 3) or with 2% by weight of polyethylene glycol (Nos. 4 to 8) having a molecular weight of 800 as lubricant, and were injection-molded to give rods measuring 5×7×65 $mm^3$.

In accordance with the invention, these rods were treated at 135° C. under atmospheric pressure with 150 g of anhydrous oxalic acid and 500 l/h of nitrogen as carrier gas for 6 hours in a 50 l oven for binder degradation. The weight loss of anhydrous oxalic acid was 85 g.

The resultant rods showed no oxidation of the surfaces, were crack-free and had the densities $D_s$ shown in the table after sintering at the temperatures $T_s$.

Example 2

The Al$_2$O$_3$ rods produced as described in Example 1 (No. 4) were treated in accordance with the invention at 130° C. and 50 mbar with 40 g of oxalic acid dihydrate for 6 hours in a 3 l oven for binder degradation. After binder removal, 27 g of oxalic acid dihydrate had sublimed out.

The weight loss of the resultant rods was 19.2%. After sintering at 1600° C. in air, they had a density of 3.89 g/cm$^3$.

Example 3

The Al$_2$O$_3$ rods produced as described in Example 1 (No. 4) were treated in accordance with the invention at 135° C. and 100 mbar with 20 g of benzenesulfonic acid and 200 l/h of nitrogen as carrier gas for 8 hours for binder degradation. After binder removal, all the benzenesulfonic acid had evaporated.

The weight loss of the resultant rods was 19.3%. After sintering at 1600° C. in air, the density was 3.90 g/cm$^3$.

TABLE

| No. | Powder | PS [μm] | POM [g] | BDF [g] | PE [g] | PEG [g] | $WL_{th}$ [%] | $WL_{br}$ [%] | $T_s$ [°C] | $D_s$ [g/cm$^3$] | $D_{th}$ [g/cm$^3$] |
|---|---|---|---|---|---|---|---|---|---|---|---|
| 1 | 2000 g Fe | 3.5 | 198 | 4 | 44 | — | 9.0 | 9.0 | 1280 | 7.64 | 7.86 |
| 2 | 1960 g Fe<br>40 g Ni | 3.5<br>7.0 | 198 | 4 | 44 | — | 9.0 | 8.9 | 1280 | 7.65 | 7.90 |
| 3 | 4500 g WC<br>500 g Co | 0.8<br>2.5 | 311 | 6 | 106 | — | 5.9 | 5.9 | 1500 | 14.0 | 14.5 |
| 4 | 1000 g Al$_2$O$_3$ | 0.7 | 239 | 5 | — | 25 | 19.3 | 19.2 | 1600 | 3.90 | 3.97 |
| 5 | 1000 g ZrO$_2$ | 0.4 | 195 | 4 | — | 24 | 16.3 | 16.3 | 1500 | 6.05 | 6.08 |
| 6 | 976 g SiC<br>4 g B<br>20 g C | 0.4<br>0.8<br>0.025 | 394 | 8 | — | 28 | 28.1 | 20.0 | 2150 | 3.10 | 3.22 |
| 7 | 930 g Si$_3$N$_4$<br>50 g Y$_2$O$_3$<br>20 g Al$_2$O$_3$ | 0.7<br>0.4<br>0.7 | 325 | 7 | — | 27 | 24.4 | 24.5 | 1850 | 3.19 | 3.25 |
| 8 | 840 g Si<br>80 g Y$_2$O$_3$<br>80 g Al$_2$O$_3$ | 2.0<br>0.4<br>0.7 | 426 | 9 | — | 29 | 29.7 | 29.7 | 1750 | 3.23 | 3.33 |

PS: particle size
POM: polyoxymethylene
BDF: butanediol formal
PE : polyethylene
PEG: polyethylene glycol
$WL_{th}$: theoretical weight loss on binder removal
$WL_{br}$: weight loss on binder removal
$T_2$: sintering temperature
$D_s$: density after sintering
$D_{th}$: theoretical density after sintering

We claim:

1. A process for the production of sintered moldings which comprises: molding a mixture of a sinterable ceramic or metallic powder and polyoxymethylene or a copolymer containing a majority of oxymethylene units as binder to give a compact, removing the binder by treatment with a gaseous acid, and sintering the molding wherein the acid is solid at room temperature and sublimes or melts and evaporates when heated.

2. The process of claim 1, wherein the binder is removed using acids having a sublimation or melting point of between 25 and 200° C.

3. The process of claim 2, wherein the binder is removed using anhydrous oxalic acid or oxalic acid dihydrate.

4. The process of claim 2, wherein the binder is removed at atmospheric pressure or under reduced pressure.

5. The process of claim 1, wherein the binder is removed using anhydrous oxalic acid or oxalic acid dihydrate.

6. The process of claim 5, wherein the binder is removed at atmospheric pressure or under reduced pressure.

7. The process of claims 1, wherein the binder is removed at atmospheric pressure or under reduced pressure.

* * * * *

UNITED STATES PATENT AND TRADEMARK OFFICE
CERTIFICATE OF CORRECTION

PATENT NO.: 5,611,978

DATED: March 18, 1997

INVENTOR(S): Peter TRUEBENBACH

It is certified that error appears in the above-identified patent and that said Letters Patent is hereby corrected as shown below:

On the cover page, insert the following foreign application priority document:

--[30] Foreign Application Priority Data
May 4, 1993   [DE]   Germany ............. P 43 14 694.5--

Signed and Sealed this

Twenty-seventh Day of May, 1997

Attest:

BRUCE LEHMAN

*Attesting Officer*            *Commissioner of Patents and Trademarks*